United States Patent Office 2,764,606
Patented Sept. 25, 1956

2,764,606

ALKYL TRI-THIOMETAPHOSPHATES

Carleton B. Scott, Pomona, Calif., assignor to Union Oil Company of California, Los Angeles, Calif., a corporation of California No Drawing. Application May 16, 1955,
Serial No. 508,821

8 Claims. (Cl. 260—461)

This invention relates to new esters of thiometaphosphoric acid and in particular concerns methyl and ethyl trithiometaphosphates and methods for preparing the same. These new compounds are useful as lubricant additives and pesticides, and by reason of the high reactivity of the thiometaphosphate group they are especially valuable as intermediates in the preparation of other organic compounds containing sulfur and phosphorus atoms. As is more fully pointed out in my copending application, Serial No. 518,390, filed June 27, 1955, these compounds may be reacted with epoxides to form valuable resinous polymers.

The new compounds provided by the invention may be prepared directly by reacting phosphorus pentasulfide with a molecular excess of methyl or ethyl mercaptan or by reaction between phosphorus pentasulfide and trimethyl- or triethyl-tetrathio-ortho-phosphate. When proceeding according to the first of such methods, the reaction is carried out simply by heating a mixture comprising phosphorus pentasulfide and preferably at least about four molecular equivalents of the desired mercaptan at a moderately elevated temperature, e. g., 90°–200° C., for 2–40 hours under sufficient pressure to maintain the reactants in the liquid phase. Conveniently, the reaction may be carried out in the presence of an inert reaction medium such as benzene, toluene, or the like. As the reaction proceeds it is advantageous gradually to reduce the pressure. Upon completion of the reaction the product is isolated from the reaction mixture and purified by conventional means, e. g., by fractional distillation or crystallization.

The following example will illustrate the preparation of one of the new compounds of the present class by reaction between phosphorus pentasulfide and methyl mercaptan, but is not to be construed as limiting the invention:

Example I

A mixture comprising 1000 parts by weight of phosphorus pentasulfide, 432 parts by weight of methyl mercaptan, and 800 parts by weight of benzene was placed in a pressure vessel which was then pressured up to about 100 p. s. i. g. with dry nitrogen. The vessel and contents were heated at about 95° C. for 4 hours, over which time the vessel was slowly vented to a final pressure of about 30 p. s. i. g. The reaction mixture was filtered hot to remove unreacted phosphorus pentasulfide. Upon cooling, the filtrate deposited large yellow crystals of methyl-trithiometaphosphate which, after recrystallization from benzene, had a melting point of about 112° C. and the following analysis:

|  | C | H | P | S |
|---|---|---|---|---|
| Calc. for $CH_3SPS_2$ | 8.4 | 2.1 | 21.9 | 67.7 |
| Found | 8.4 | 2.6 | 21.6 | 64.1 |

While preparation of the new alkyl trithiometaphosphates by the direct method described above is exceedingly simple and straightforward, I have found that better yields are obtained by effecting their formation by reaction between phosphorus pentasulfide and trimethyl- or triethyl-tetrathio-ortho-phosphates. The latter may readily be prepared by reaction between phosphorus pentasulfide and the corresponding alkyl mercaptans at temperatures between about 90° C. and about 200° C. The reaction between phosphorus pentasulfide and a trialkyl-tetrathio-ortho-phosphate to form the corresponding alkyl-trithiometaphosphate proceeds smoothly merely upon heating a mixture of the two reactants at reflux temperature, i. e. at 90–200° C., for 2–20 hours, preferably in the presence of an inert reaction medium such as benzene or xylene. Since both reactants are relatively high-boiling, the reaction may be carried out at atmospheric pressure, although sub- or super-atmospheric pressures may be employed if desired. Usually, the reactants are employed in equimolecular proportions, although an excess of either may be employed if desired. Upon completion of the reaction, the product is separated from the reaction mixture in the usual manner, e. g., by fractional distillation or crystallization.

The following example will illustrate the preparation of one of the members of the present class of new compounds from the corresponding trialkyl-tetrathio-ortho-phosphate as above explained, but is not to be construed as limiting the invention:

Example II

Triethyl-tetrathio-ortho-phosphate was obtained as a viscous liquid distilling at about 110° C. under 0.15 mm. pressure by heating 666 parts by weight of phosphorus pentasulfide with 930 parts by weight of ethyl mercaptan at about 100° C. for four hours, and thereafter fractionally distilling the reaction product. A mixture consisting of 61.5 parts by weight of the distilled tetrathio-ortho-phosphate, 55.5 parts by weight of phosphorus pentasulfide and 86 parts by weight of xylene was then heated at reflux temperature for 20 hours, after which the reaction product was filtered and cooled. Ethyl-trithiometaphosphate crystallized from the cooled filtrate in the form of yellow needles which, after recrystallization from benzene, had a melting point of about 57° C.

Other modes of applying the principle of my invention may be employed instead of those explained change being made as regards the methods or materials employed provided the products or steps stated by the following claims, or the equivalent of such stated products or steps be obtained or employed.

I, therefore, particularly point out and distinctly claim as my invention:

1. An alkyl trithiometaphosphate having the general formula:

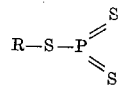

wherein R represents an alkyl group selected from the class consisting of methyl and ethyl.

2. Methyl trithiometaphosphate, a yellow crystalline solid melting at about 112° C. and having the formula:

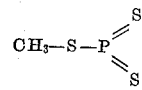

3. Ethyl-trithiometaphosphate, a yellow crystalline solid melting at about 57° C. and having the formula:

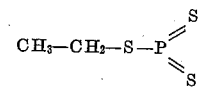

4. The method of preparing an alkyl-trithiometaphosphate of the formula RSPS$_2$, wherein R represents an alkyl radical selected from the class consisting of methyl and ethyl, which comprises heating a trialkyl-tetrathio-ortho-phosphate of the general formula (RS)$_3$PS with phosphorus pentasulfide.

5. The method of claim 4 wherein the heating is carried out at a temperature between about 90° C. and about 200° C.

6. The method of claim 4 wherein the reaction is carried out in the presence of an inert organic solvent.

7. The method of claim 4 wherein the trialkyl-tetrathio-ortho-phosphate and phosphorus pentasulfide are employed in approximately equimolecular proportions.

8. The process which comprises heating phosphorus pentasulfide with an alkyl mercaptan selected from the class consisting of methyl mercaptan and ethyl mercaptan at a temperature between about 90° C. and about 200° C. under sufficient pressure to maintain said reactants in the liquid phase, and recovering an alkyl-trithiometaphosphate from the reaction product so obtained.

No references cited.